US011882011B2

(12) United States Patent
Kruse et al.

(10) Patent No.: US 11,882,011 B2
(45) Date of Patent: *Jan. 23, 2024

(54) DISTRIBUTED WORKLOAD REASSIGNMENT FOLLOWING COMMUNICATION FAILURE

(71) Applicant: Microsoft Technology Licensing, LLC, Redmond, WA (US)

(72) Inventors: David Kruse, Kirkland, WA (US); Qibo Zhu, Sammamish, WA (US); David Dion, Bothell, WA (US); Vladimir Petter, Bellevue, WA (US); Lokesh Srinivas Koppolu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/544,170

(22) Filed: Dec. 7, 2021

(65) Prior Publication Data
US 2022/0166690 A1    May 26, 2022

Related U.S. Application Data

(63) Continuation of application No. 15/831,238, filed on Dec. 4, 2017, now Pat. No. 11,228,510, which is a
(Continued)

(51) Int. Cl.
*H04L 43/00* (2022.01)
*G06F 16/182* (2019.01)
(Continued)

(52) U.S. Cl.
CPC .............. *H04L 43/00* (2013.01); *G06F 3/067* (2013.01); *G06F 9/5027* (2013.01); *G06F 9/52* (2013.01);
(Continued)

(58) Field of Classification Search
CPC ....... H04L 43/00; H04L 43/026; H04L 43/04; H04L 43/062; H04L 67/61;
(Continued)

(56) References Cited

U.S. PATENT DOCUMENTS 7,979,862 B2 *  7/2011  Miller ................... G06F 9/5083
                                                                  718/1
8,555,238 B2 * 10/2013  White ....................... G06F 8/30
                                                                  717/124
(Continued)

OTHER PUBLICATIONS

"Office Action Issued in Brazilian Patent Application No. BR112017002518-3", dated Sep. 26, 2022, 7 Pages.
(Continued)

*Primary Examiner* — Thu Ha T Nguyen
(74) *Attorney, Agent, or Firm* — Workman Nydegger

(57) ABSTRACT

A generation identifier is employed with various systems and methods in order to identify situations where a workload has been reassigned to a new node and where a workload is still being processed by an old node during a failure between nodes. A master node may assign a workload to a worker node. The worker node sends a request to access target data. The request may be associated with a generation identifier and workload identifier that identifies the node and workload. At some point, a failure occurs between the master node and worker node. The master node reassigns the workload to another worker node. The new worker node accesses the target data with a different generation identifier, indicating to the storage system that the workload has been reassigned. The old worker node receives an indication from the storage system that the workload has been reassigned and stops processing the workload.

20 Claims, 9 Drawing Sheets

Related U.S. Application Data continuation of application No. 14/457,842, filed on Aug. 12, 2014, now Pat. No. 9,847,918.

(51) Int. Cl.

| | | |
|---|---|---|
| *G06F 16/176* | (2019.01) | |
| *G06F 9/50* | (2006.01) | |
| *G06F 9/52* | (2006.01) | |
| *G06F 11/20* | (2006.01) | |
| *H04L 69/40* | (2022.01) | |
| *H04L 67/61* | (2022.01) | |
| *H04L 67/1001* | (2022.01) | |
| *G06F 3/06* | (2006.01) | |
| *H04L 67/1029* | (2022.01) | |
| *H04L 67/1034* | (2022.01) | |

(52) U.S. Cl.
CPC ...... *G06F 11/2046* (2013.01); *G06F 16/1774* (2019.01); *G06F 16/182* (2019.01); *H04L 67/1001* (2022.05); *H04L 67/61* (2022.05); *H04L 69/40* (2013.01); *H04L 67/1029* (2013.01); *H04L 67/1034* (2013.01)

(58) Field of Classification Search
CPC ............. H04L 67/1001; H04L 67/1029; H04L 67/1034; H04L 69/40; G06F 16/182; G06F 16/1774; G06F 3/067; G06F 9/5027; G06F 9/52
USPC .................................................. 709/201, 202
See application file for complete search history.

(56) References Cited

U.S. PATENT DOCUMENTS

| | | | | |
|---|---|---|---|---|
| 8,706,798 | B1* | 4/2014 | Suchter | H04L 47/83 709/224 |
| 8,769,537 | B1* | 7/2014 | Ruggiero | G06F 9/46 718/100 |
| 9,154,367 | B1* | 10/2015 | Kontothanassis | G06F 9/505 |
| 9,847,918 | B2* | 12/2017 | Kruse | H04L 67/1001 |
| 10,089,586 | B2* | 10/2018 | Vestal | G05D 1/0274 |
| 10,310,903 | B2* | 6/2019 | McPherson | G06F 11/1474 |
| 2002/0138376 | A1* | 9/2002 | Hinkle | G06Q 40/04 705/30 |
| 2011/0016050 | A1* | 1/2011 | Evans | G06Q 20/386 705/44 |
| 2014/0229614 | A1* | 8/2014 | Aggarwal | H04L 65/1063 709/224 |
| 2014/0269254 | A1* | 9/2014 | Choorakkot Edakkunni | H04L 45/586 370/218 |
| 2015/0205634 | A1* | 7/2015 | McPherson | G06F 9/5027 718/102 |
| 2015/0278397 | A1* | 10/2015 | Hendrickson | G06F 16/9024 707/798 |
| 2016/0179642 | A1* | 6/2016 | Cai | H04L 67/1034 714/4.12 |
| 2016/0371153 | A1* | 12/2016 | Dornemann | G06F 11/1458 |
| 2016/0373291 | A1* | 12/2016 | Dornemann | H04L 67/56 |
| 2017/0139816 | A1* | 5/2017 | Sapozhnikov | G06F 11/3664 |
| 2017/0235610 | A1* | 8/2017 | Gunsolley | G06F 11/0709 714/15 |
| 2017/0235676 | A1* | 8/2017 | Cassell | G06F 12/0813 711/126 |
| 2017/0272209 | A1* | 9/2017 | Yanovsky | G06F 12/0253 |
| 2017/0293839 | A1* | 10/2017 | Thompson | G06N 3/126 |
| 2019/0361916 | A1* | 11/2019 | Weaver | G06F 16/2365 |
| 2020/0097348 | A1* | 3/2020 | Mahindru | G06F 11/008 |
| 2021/0014177 | A1* | 1/2021 | Kasichainula | H04L 47/6295 |
| 2022/0108167 | A1* | 4/2022 | Upadhyay | G06F 3/061 |
| 2022/0276901 | A1* | 9/2022 | Ravala | G06F 9/5038 |
| 2022/0398204 | A1* | 12/2022 | Auernhammer | G06F 13/24 |

OTHER PUBLICATIONS

U.S. Appl. No. 15/831,238, filed Dec. 4, 2017.
U.S. Appl. No. 14/457,842, filed Aug. 12, 2014.
U.S. Appl. No. 15/414,817, filed Jan. 25, 2017.
U.S. Appl. No. 16/583,833, filed Sep. 26, 2019.
U.S. Appl. No. 14/454,415, filed Aug. 7, 2014.
"Office Action Issued in Brazilian Patent Application No. BR112017001850-0", dated Oct. 25, 2022, 7 Pages.

* cited by examiner

DISTRIBUTED WORKLOAD REASSIGNMENT FOLLOWING COMMUNICATION FAILURE

CROSS-REFERENCE TO RELATED APPLICATIONS

This is a continuation of U.S. patent application Ser. No. 15/831,238, entitled "DISTRIBUTED WORKLOAD REASSIGNMENT FOLLOWING COMMUNICATION FAILURE", filed on Dec. 4, 2017 and issued as U.S. Pat. No. 11,228,510 on Jan. 18, 2022, which is a continuation of U.S. patent application Ser. No. 14/457,842, entitled "DISTRIBUTED WORKLOAD REASSIGNMENT FOLLOWING COMMUNICATION FAILURE", filed on Aug. 12, 2014 and issued as U.S. Pat. No. 9,847,918 on Dec. 19, 2017, the entire contents of which are incorporated herein by reference for all purposes.

BACKGROUND

Clustered environments, e.g., environments where workloads are distributed across multiple machines, are commonly used to provide failover and high availability processing of distributed workloads. Clustered environments allow workloads to be distributed to one or more nodes that are part of the environment. A clustered environment can act as a client, a server, or both. In a cluster, a workload may be distributed by master nodes to worker nodes that make up the cluster. Worker nodes may issue access requests for target data that is stored by a storage system. If an error occurs between the master node and the worker node, the worker node may continue processing the workload without the knowledge of the master node. Further, the master node may reassign the workload to a different node without the knowledge of the worker node.

It is with respect to these and other considerations that examples have been made. Also, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Systems and methods disclosed herein provide mechanisms to identify situations where a workload has been reassigned to a new node and where a workload is still being processed by an old node. According to some aspects, a master node assigns a workload to a worker node. The master node may communicate a generation identifier and workload identifier with the workload. When processing the workload, the worker node sends an access request to a node in a storage cluster to access target data. In examples, the generation identifier and workload identifier are used to identify the node and/or related workload requesting a resource. The generation identifier and/or workload identifier may be provided with the request. When the node accesses the target data, the generation identifier and/or workload identifier are stored in persistent storage and associated with the requested target data.

Before the node completes execution of the workload, a failure may occur that causes the master node to lose communication with the worker node. For example, a node may reboot, a hardware failure may occur, a communications link may fail, etc. In such circumstances, the master node is unaware of the status of the worker node. However, the worker node may still have access to the storage system and may continue processing the workload and issuing file access requests. During the failure, the master node may reassign the workload to a new worker node. In some examples, the master node may also communicate a different generation identifier along with the workload identifier and workload. When the new worker node begins processing the workload, it sends an access request to a node in the storage cluster to access target data. In some examples, the new generation identifier and/or workload identifier may be provided with the request. The new generation identifier may indicate a higher priority than the old generation identifier. When the new node accesses the target data, the new generation identifier is stored in persistent storage and associated with the requested target data. The generation identifier permits the storage system managing the request to determine that the workload has been reassigned to a new node. Doing so allows the storage system to indicate to the old node that the workload has been reassigned. As a result, the old node may stop processing the workload. Further, the old node is assured that the workload has not been reassigned if it has not received a reassignment indication from the storage system.

In other examples, the new generation identifier may indicate a lower priority than the old generation identifier, or the new node may issue a "permissive" access request. In both cases, the new node does not start processing the workload while the old node is still processing the workload. Instead, the new node may receive an indication that the old node is still working and, as a result, the new node may periodically issue subsequent access requests to ultimately gain access once the old node has finished processing. Doing so allows the old node to continue processing a workload rather than interrupting an operation and restarting the workload on the new node.

Examples may be implemented as a computer process, a computing system, or as an article of manufacture such as a computer program product or computer readable media. The computer program product may be a computer storage media readable by a computer system and encoding a computer program of instructions for executing a computer process.

BRIEF DESCRIPTION OF THE DRAWINGS

Non-limiting and non-exhaustive examples are described with reference to the following figures.

DETAILED DESCRIPTION

Figure 1:
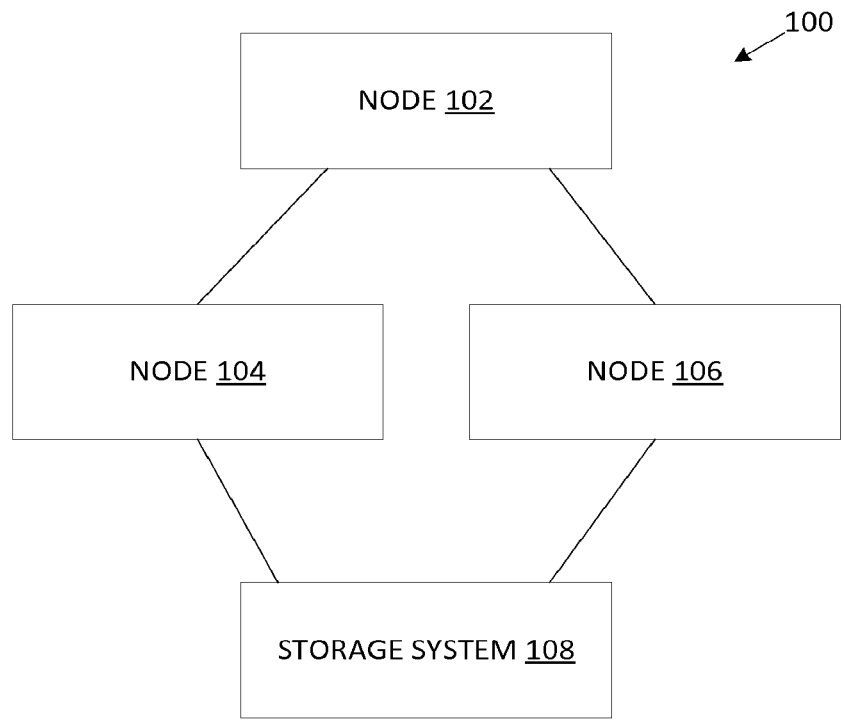
FIG. 1 illustrates a system that may be used to implement examples described herein.

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

Examples of the present disclosure are related to providing high availability processing of distributed workloads by enabling a storage system to notify a node when its workload has been reassigned. In examples, a storage system may be a local device, a network-attached storage device, a distributed file server, or any other type of storage system in a computing environment. Nodes may be part of a cluster in which "worker" nodes process workloads that are assigned by "master" nodes. In some examples, a cluster may be comprised of multiple tiers, wherein lower-tiered worker nodes receive workload assignments from higher-tiered master nodes. In other examples, a cluster may have only one tier, in which each node may behave as a worker node, a master node, or both.

In an example, a worker node may be assigned a workload from a master node. The worker node in turn may act as a master node for subordinate worker nodes and, as a result, may further distribute the workload to one of its subordinate worker nodes. The nodes may be connected via a network. One of skill in the art will appreciate that the systems and methods disclosed herein may be employed in any other type of environment, such as, but not limited to, a virtual network.

Data may be shared among a plurality of requestors. As used herein, a requestor may comprise any node, application, workload, thread, or other process or entity requesting access to target data. Although examples described herein may be described with respect to an "application" or "client" or "node" or "workload" acting as a requestor, the present disclosure is not so limited. When the requestor accesses target data, the target data may be locked, thereby prohibiting other requestors from accessing it until the lock is released. Locking the target data may be employed to protect against a conflict—that is, to protect against modification of the target data by another requestor before the accessing requestor has performed its operations. Typically, when a lock is granted, the lock may be preempted by another requestor in some examples. For example, the storage system may maintain the lock using a workload identifier presented, or referred to, by the requestor in an access request.

In some instances, when a failure occurs affecting a master node's communication with a worker node, the master node may become unaware of the status of the worker node. For example, the failure may be the result of a communication issue between the master node and the worker node, or the result of reboot of the worker node. As a result, the worker node may be running normally and is therefore still processing the workload, or the worker node may have experienced a failure and the workload is no longer being processed. Further, the worker node may still have access to file information stored by a storage system. For example, the storage system may be accessible via a different network path than the master node.

Due to the failure, the master node may reassign the workload to another worker node. As a result, the new worker node may request access to data that is or was previously locked by the old worker node. In some examples, the storage system may determine that the workload identifier associated with the access request from the new node matches the lock placed on the target data by the old node. The storage system then breaks the old lock and places a new lock on the target data.

However, if the old node is still processing the workload, an access request from the old node for the target data will result in the same behavior described above. The storage system will determine that the old node's access request is associated with the workload identifier, break the new node's lock, and place another lock on the target data for the old node. As a result, the two nodes may continue to reacquire a lock for the same target data, unaware of the other node's presence. This may negatively impact the performance of the cluster. For example, this may result in delayed processing of workloads or interruptions that require workload processing to restart rather than allowing the old node to finish processing, e.g., interrupting a video encoding workload which then must restart the encoding process. The systems and methods disclosed herein provide mechanisms to identify situations where a workload has been reassigned to a new node and where a workload is still being processed by an old node, thereby mitigating the impact on workload processing after a failure.

FIG. 1 illustrates a system 100 that may be used to implement some examples. System 100 includes nodes 102, 104, and 106, as well as storage system 108. In the illustrated example, node 102 acts as a master node for nodes 104 and 106. Nodes 104 and 106 act as worker nodes and process workloads assigned to them by node 102. Storage system 108 stores information that is accessed by nodes 104 and 106. Although in FIG. 1 only nodes 104 and 106 are shown communicating with storage system 108, in other examples there may be more than two nodes that act as worker nodes and access information from storage system 108. Additionally, although in FIG. 1 only node 102 is shown acting as a master node in relation to nodes 104 and 106, in other examples there may be more than one master node that assigns workloads to worker nodes.

In accordance with one example, nodes 102, 104, and 106 are utilized to provide high availability processing of distributed workloads. This is done by utilizing components on nodes 102, 104, and 106 and storage system 108 to divide workloads and redistribute work among various nodes in the event of a failure between master node 102 and worker nodes 104 and 106. As described in greater detail below, the reassignment notifications provided to a node when its workload is reassigned allows the node cluster to provide high availability handling of distributed workloads. In examples, nodes 104 and 106 may communicate with storage system 108 using the Server Message Block (SMB) 2.0/3.0 protocol.

To illustrate one example, node 102 may assign a first workload to node 106. The first workload may be associated with a first generation identifier and/or a first workload identifier, which may be communicated to node 106 along with the first workload. Node 106 begins processing the first workload, sending file access requests for target data stored by storage system 108 as necessary. The file access requests may include or refer to a generation identifier and/or a workload identifier, such as the first generation identifier and the first workload identifier.

Storage system 108 receives the access requests for target data. In some examples, storage system 108 may determine whether the target data is locked and therefore associated with different a different generation identifier and/or workload identifier. If the target data is locked, storage system 108 may deny the file access request, may break the lock, or may take other action depending on the protocol being employed.

Upon determining that the request should be granted, the generation identifier and/or workload identifier may be stored by storage system 108 in persistent storage. When the generation identifier and/or workload identifier are stored in persistent storage, they may be referred to herein as a stored generation identifier and a stored workload identifier. In some examples, the target data may be locked prior to, or after, granting the access request. Further, the lock may be configured to be released (thereby allowing other nodes to have access to the target data) upon all operations in the request being completed. The lock may expire after a specified time period or upon the shorter of the specified time period and the time at which all operations in the request are completed. In still other examples, the lock may provide the node exclusive access to the target data until the client releases the lock or until an event occurs breaking the lock. For example, pursuant to the SMB protocol, an exclusive OpLock from the storage system 108 may be provided to the node 106. The node 106 may assume that it is the only node with access to the target data, and the node 106 may cache all target data locally, as well as cache all changes to the target data before committing the changes to the storage system 108. If another node/workload tries to open the same target data, the storage system 108 sends a message to the node 106 (called a break or revocation), which invalidates the exclusive OpLock previously given to the node 106. The node 106 then flushes all changes to the target data and commits them to the storage system 108.

At some point, node 102 may experience a communication failure with node 106. The failure may result, in some examples, from a disconnection, a hardware failure, or a reboot, etc. As a result of the failure, node 102 reassigns the first workload to node 104 by generating a second generation identifier. The second generation identifier, first workload identifier, and first workload are communicated to node 104. In some examples, node 102 may wait a predetermined amount of time before reassigning the first workload to node 104.

Node 104 begins processing the first workload, sending file access requests for target data stored by storage system 108 as necessary. A file access request may include or refer to a generation identifier and/or a workload identifier, such as the second generation identifier and the first workload identifier.

Storage system 108 receives the file access requests. If the target data is locked (e.g., by node 106 using the same workload identifier), storage system 108 determines whether the second generation identifier denotes a higher priority than the stored generation identifier. If the second generation identifier indicates a higher priority than the stored generation identifier, storage system 108 breaks the lock placed on the target data by node 106, locks the target data for node 104, and grants the access request. If the second generation identifier does not indicate a higher priority, storage system 108 may indicate to node 104 that the target data is locked. Further, the indication may also inform node 104 that the target data is locked by node 106. If the second generation identifier indicates a higher priority than the stored generation identifier, storage system 108 replaces the stored generation identifier with the second generation identifier.

In some examples, access requests issued by node 104 may be permissive, meaning that rather than expecting storage system 108 to break a lower-priority lock on the target data, node 104 indicates that a higher-priority access request should not be granted while the target data is locked or in-use. For example, rather than breaking the lock of node 106 on the target data, storage system 108 denies the permissive access request from node 104 and instead provides a notification that node 106 is still processing the first workload. Even though node 106 is unable to communicate with node 102, node 106 continues processing the workload as long as node 106 is able to communicate with storage system 108. As a result, execution of the workload is not interrupted by node 104. Node 104 may then periodically send subsequent permissive access requests to storage system 108 to obtain access to the target data once node 106 is finished. The first generation identifier may be retained by storage system 108 as the stored generation identifier until a higher-priority file access request from node 104 is granted, after which the second generation identifier may be stored as the stored generation identifier.

In other examples, the second generation identifier generated by node 102 may indicate a lower priority than the first generation identifier. As a result, file access requests sent by node 104 are denied while the target data remains in use by node 106. If node 106 is processing the workload and still has access to storage system 108, the lower-priority generation identifier allows node 106 to continue processing the workload without being interrupted by node 104. Node 104 may continue sending periodic access requests to storage system 108. Upon ultimately obtaining access to the target data, node 104 may indicate its success to node 102. Node 102 then generates a third generation identifier which indicates a higher priority than the first generation identifier and communicates the third generation identifier to node 104. Node 104 may then use the third generation identifier rather than the second generation identifier in subsequent file access requests. After node 104 successfully accesses the target data using the third generation identifier, storage system 108 may retain the third generation identifier as the stored generation identifier.

Despite the communication failure between nodes 102 and 106, node 106 may continue processing the first workload. After the first workload has been reassigned to node 104 and node 104 has been granted access to the target data by storage system 108, node 106 may make a file access request for target data. The file access request may include or refer to the first generation identifier. Upon receiving the file access request, storage system 108 evaluates the generation identifier associated with the file access request. Storage system 108 determines that the first generation identifier associated with the file access request indicates a lower priority than the stored generation identifier. As a result, storage system 108 denies the file access request and indicates to node 106 that its workload has been reassigned to another node. In some examples, the indication may inform node 106 that the workload has been reassigned to node 104. Node 106 may then stop processing the first workload.

In other examples, node 104, while acting as a worker node, may also act as a master node. Node 104 may assign a second workload to another node within its tier, e.g., node 106. The second workload may be associated with a second workload identifier and a fourth generation identifier. In that example, the fourth generation identifier, the second workload identifier, and second workload are communicated to node 106. Node 106 begins processing the second workload, sending file access requests for target data stored by storage system 108 as necessary. A file access request may include or refer to a generation identifier and/or a workload identifier, such as the fourth generation identifier and the second workload identifier. As discussed above, storage system 108 stores the fourth generation identifier in persistent storage and grants the access requests.

At some point, node 104 may experience a communication failure with node 106. As a result of the failure, node 104 reassigns the second workload to a new node (not pictured) within its tier by generating a fifth generation identifier. The fifth generation identifier, the second workload identifier, and the second workload are then communicated to the new node. The new node begins processing the second workload.

As discussed above, the reassignment may be permissive, either by providing a lower-priority fifth generation identifier or by issuing file access requests along with an indication requesting permissive behavior. In both examples, node 106 is able to finish processing the second workload in the event that it is operating normally but is unable to communicate with node 104. Therefore, if the reassignment is permissive, the new node may only gain access to the target data if node 106 is no longer accessing the target data, e.g., if node 106 has finished processing, lost connectivity with storage system 108, or experienced a failure in addition to the communication failure with node 104. In the event that the fifth generation identifier did not indicate a higher priority than the stored generation identifier, once the new node gains access to the target data, the new node may receive a higher-priority sixth generation identifier from node 104. The higher-priority generation identifier may then be stored by storage system 108.

Despite the communication failure between nodes 104 and 106, node 106 may continue processing the second workload. After the second workload has been reassigned to the new node and the new node has been granted access to the target data by storage system 108, node 106 may make a file access request for target data. The file access request may include or refer to the fourth generation identifier. Upon receiving the file access request, storage system 108 evaluates the generation identifier associated with the file access request. Storage system 108 determines that the fourth generation identifier associated with the file access request indicates a lower priority than the stored generation identifier. As a result, storage system 108 denies the file access request and indicates to node 106 that its workload has been reassigned to another node. In some examples, the indication may inform node 106 that the workload has been reassigned to the new node. Node 106 may then stop processing the second workload.

In additional examples, node 102 may migrate a third workload that is being processed by node 106 from node 106 to node 104. The third workload may be associated with a third workload identifier. Further, the third workload may already be associated with a seventh generation identifier that is used by node 106 when issuing file access requests to storage system 108. Node 102 generates an eighth generation identifier. The eighth generation identifier may indicate a higher priority than the seventh generation identifier. The eighth generation identifier, the third workload identifier, and the third workload are then communicated to node 104. At some point during the migration operation, a failure may occur between nodes 102 and 104. As a result, node 102 is unaware whether the migration operation completed successfully and whether node 104 started processing the third workload. Node 102 is therefore unable to determine what action node 106 should take, e.g., whether it should stop or continue processing the third workload.

However, if the migration operation completed successfully, node 104 will begin processing the third workload, issuing file access requests to storage system 108 as necessary. As a result, storage system 108 stores the associated eighth generation identifier and grants the file access requests as described above. Upon receiving a subsequent file access request from node 106, storage system 108 determines that the associated seventh generation identifier indicates a lower priority than the stored generation identifier and provides an indication that the workload has been reassigned. The indication may inform node 106 that the workload has been migrated to node 104.

If the migration operation did not complete successfully, node 106 continues processing the third workload. The generation identifier enables the cluster to ensure that the third workload is continually processed by a node within the cluster, regardless of whether a migration operation fails. Further, it provides an alternative notification channel via storage system 108 in the event of a successful migration where node 102 is unable to notify node 106 that the workload has been migrated to a different node.

The foregoing description is merely one example of how the example shown in FIG. 1 may operate. As described in greater detail below, examples may involve different steps or operations. These may be implemented using any appropriate software or hardware component or module.

Figure 2:
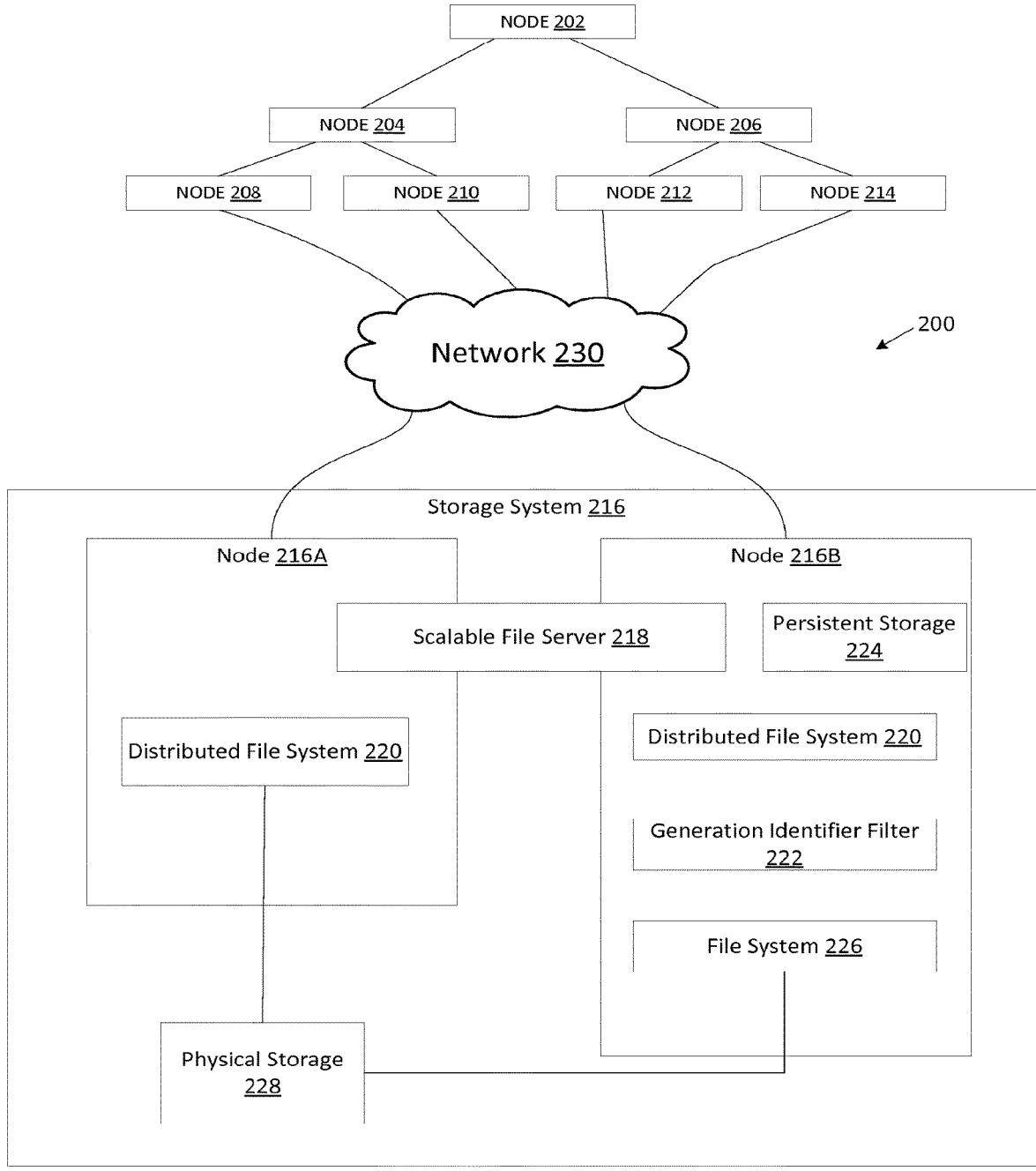
FIG. 2 illustrates a system that may be used to implement examples described herein.

FIG. 2 illustrates a system 200 that may be used to implement some examples. System 200 includes nodes 202, 204, 206, 208, 210, 212, and 214. Node 202 acts as a master node for nodes 204 and 206. Nodes 204 and 206 may act as worker nodes and process workloads assigned to them by node 202. Further, node 204 acts as a master node for nodes 208 and 210, and node 206 acts as a master node for 212 and 214. Nodes 204 and 206 may act as both master nodes and worker nodes. Nodes 208 and 210 act as worker nodes and process workloads assigned to them by node 204. Similarly, nodes 212 and 214 act as worker nodes and process workloads assigned to them by node 206. Storage system 216 stores information that is accessed by nodes 208, 210, 212, and 214 via network 230. Although in FIG. 2 only nodes 208, 210, 212, and 214 are shown communicating with storage system 216, in other examples there may be more (or fewer) than four nodes that access file information stored by storage system 216, including nodes 202, 204, and 206.

As shown in FIG. 2, storage system 216 includes nodes 216A and 216B, which provide both high availability and redundancy for scalable file server 218. In examples, the storage system 216 provides a scalable file server 218 that is accessed by nodes 208, 210, 212, and 214. Scalable file server 218 may comprise multiple clustered servers that may cooperate to provide file information from distributed file system 220. Distributed file system 220 comprises file information that is stored on physical storage 228. File system 226 of physical storage 228 is mounted on node 216B. In some examples, the format of file system 226 may be New Technology File System (NTFS) or Resilient File System (ReFS). Node 216B acts as the coordinator of distributed file system 220 and relays file operations, e.g., read, write, and metadata operations, from distributed file system 220 to file system 226. In some examples, node 216A may perform file operations directly on physical storage 228, though node 216B may have exclusive write access such that write requests are forwarded by node 216A to node 216B rather than being directly sent to physical storage 228. Additionally, a generation identifier filter 222 associates access requests with generation identifiers that are then stored in persistent storage 224. For example, persistent storage 224 may comprise a generation identifier filter database utilized by a generation identifier filter attached to an NTFS file system. Although two nodes are shown in FIG. 2, in other examples storage system 216 may include more than two nodes, or fewer than two nodes.

FIG. 2 illustrates three "tiers" of nodes and multiple subgroups. Node 202 comprises a global master tier. Nodes 204 and 206 comprise a local master tier, and nodes 208, 210, 212, and 214 comprise a local worker tier. Nodes in the global master tier may distribute work to nodes in the local master tier. Nodes in the local master tier may distribute work to nodes in the local worker tier. Further, nodes 204, 208, and 210 comprise one subgroup, while nodes 206, 212, and 214 may comprise another subgroup. As a result, node 204 may distribute workloads between nodes 208 and 210, and node 206 may distribute workloads between nodes 212 and 214. However, node 202, as the top-most node, is responsible for overall workload distribution and may distribute workloads independent of distribution decisions made by nodes 204 and 206. For example, node 202 may reassign a workload within the local master tier from node 204 to node 206, regardless of whether node 204 further distributed the workload to nodes in the local worker tier (e.g., to nodes 208 or 210). Although FIG. 2 only shows three tiers of nodes, in other examples there may be more (or fewer) than three tiers in which nodes in higher tiers may assign workloads to nodes in lower tiers. Though FIG. 2 depicts a specific number of nodes in each tier, a tier may contain a varying number of nodes.

Generation identifier creation may capture the hierarchical decision structure that is present between nodes 202, 204, 206, 208, 210, 212, and 214. In one example, the generation identifier may be a 128-bit identifier that is then subdivided into two subparts, such that the first 64 bits denote a major identifier and the last 64 bits denote a minor identifier. The major identifier is altered when assigning workloads among nodes comprising the second tier (e.g., nodes 204 and 206). Similarly, the minor identifier is altered when assigning workloads among nodes comprising the third tier, e.g., nodes 208, 210, 212, and 214. As a result, the subparts of a generation identifier may be evaluated differently when considering the priority of one generation identifier versus another generation identifier. A generation identifier having a higher priority major identifier in relation to the major identifier of another generation identifier may be determined to have a higher priority regardless of the priority indicated by the minor identifiers. Similarly, the priority relationship of two generation identifiers with major identifiers that indicate a similar priority may be determined by comparing the priorities that are indicated by the minor identifiers. In other examples, a generation identifier may have a different length and may be subdivided into more, or fewer, than two parts in order to represent the hierarchical decision structure.

If the priority indicated by a subpart of a generation identifier reaches the maximum possible encoded value, a subsequent higher-priority generation identifier may be obtained by sending a request for a higher-priority generation identifier to a master node. For example, if node 204 exhausts all possible encoded values for the minor identifier subpart of a generation identifier, node 204 may indicate to node 202 that all possible minor identifiers have been exhausted for a given major identifier. Node 202 then responds with a new generation identifier comprised of a higher-priority major identifier and a minor identifier. Node 204 may then continue to alter the minor identifier subpart of the new generation identifier in order to provide subsequent higher-priority generation identifiers.

In other examples, a higher-priority generation identifier may be generated by "rolling over" the exhausted subpart from the maximum possible encoded value back to a starting value (e.g., the minimum possible encoded value). For example, if a minor identifier is represented by an unsigned integer, the minor identifier "rolls over" from the maximum possible encoded value to zero. The major identifier is unchanged. When comparing two identifiers, a priority determination is made by subtracting the last valid value for each respective subpart of the generation identifier from the equivalent subpart of another generation identifier. The subtraction operation may utilize two's-complement math, such that subtracting the maximum possible encoded value from a rolled over value results in a positive value. A negative value resulting from the subtraction operation indicates a lower priority, whereas a positive value indicates a higher priority. The priority relationship of the generation identifiers is then evaluated by assessing the individual subparts of the generation identifiers as described above.

In accordance with examples, nodes 202, 204, 206, 208, 210, 212, and 214 are utilized to provide high availability processing of distributed workloads. This is done by utilizing components on the nodes and storage system 216 to divide workloads and redistribute work among various nodes in the event of a failure between a master node and a worker node. As described in greater detail below, the reassignment notifications provided to a node when its workload is reassigned allow the node cluster to provide high availability handling of distributed workloads.

Node 202, in examples, is responsible for dividing and assigning a distributed workload to worker nodes. Node 202 may assign a first workload to node 204. Node 204 may further distribute the workload to one of its worker nodes, e.g., node 210. The first workload may be associated with a first generation identifier comprised of a first major number and a first minor number. The first workload may also be associated with a first workload identifier. The first generation identifier, first workload identifier, and first workload may be communicated to node 210.

Node 210 begins processing the first workload, sending file access requests for target data to node 216A as necessary. An access request may be associated with or include a generation identifier and/or a workload identifier. For example, when a new workload is started, an indication of the generation identifier may be communicated to node 216A. The access request for target data may include a number of file operations to perform on the target data. The operations may be, for example, opens to read/write data, enumerate attributes, lease requests to allow caching of data locally, or other file access operations.

In one example, the generation identifier may be stored in a _NETWORK_APP_INSTANCE_VERSION_ECP_CONTEXT structure. The _NETWORK_APP_INSTANCE_VERSION_ECP_CONTEXT structure may be defined as follows:

```
typedef struct
    _NETWORK_APP_INSTANCE_VERSION_ECP_CONTEXT {
    USHORT Size;
    USHORT Reserved;
    UINT64 VersionHigh;
    UINT64 VersionLow;
    } NETWORK_APP_INSTANCE_VERSION_ECP_CONTEXT,
*PNETWORK_APP_INSTANCE_VERSION_ECP_CONTEXT;
```

In such examples, the variable size may store information related to the size of the structure, the variable VersionHigh may be a major identifier, and the variable VersionLow may be a minor identifier. In some examples, the _NETWORK_APP_INSTANCE_VERSION_ECP_CONTEXT, or another object or variable containing the generation identifier may be stored in persistent storage 224. In examples, the NETWORK_APP_INSTANCE_VERSION_ECP_CONTEXT structure may be sent from a node to a storage system in association with a request to access a resource (e.g., a create or open request). In one example, the generation identifier may be stored by a node that is processing a workload or distributing workloads, e.g., a master node or a worker node. In another example, although not shown in FIG. 2, the node cluster may have a central repository that stores generation identifiers. In such an example, multiple nodes in the cluster may access the centralized repository. In yet another example, generation identifiers may be stored across multiple repositories. In such examples, the node cluster may employ a replication algorithm to ensure that the multiple repositories contain the same generation identifiers.

Node 216A receives the access request for target data. Upon determining that the request should be granted, generation identifier filter 222 stores the generation identifier included, or associated, with the access request from node 210 in persistent storage 224. In some examples, the target data may then be locked.

At some point, node 210 may experience a communication failure with node 204. The failure may result from, e.g., a disconnection, a hardware failure, or a reboot. As a result of the failure, node 204 reassigns the first workload to node 208 by generating a second generation identifier comprising the first major identifier and a second minor identifier. The second generation identifier, first workload identifier, and first workload may be communicated to node 208.

Node 208 begins processing the first workload, sending a file access request for the target data to node 216A as necessary. A file access request may include or refer to a generation identifier and/or a workload identifier, such as the second generation identifier and the first workload identifier.

Node 216A receives the file access request. If the target data is locked (e.g., by node 210 using the same workload identifier), scalable file server 218 determines whether the second generation identifier denotes a higher priority than the stored generation identifier. The major identifiers of both the second generation identifier and the stored generation identifier indicate the same priority, so scalable file server 218 compares the minor identifiers. If the minor identifier of the second generation identifier indicates a higher priority than the minor identifier of the stored generation identifier, node 216A breaks node 210's lock on the target data, locks the target data for node 208, and grants the access request. If the minor identifier of the second generation identifier does not indicate a higher priority, node 216A may indicate to node 208 that the target data is locked. Further, the indication may also inform node 208 that the target data is locked by node 210. If the second generation identifier indicates a higher priority than the stored generation identifier, the generation identifier stored in persistent storage 224 is replaced with the second generation identifier, which becomes the stored generation identifier.

Node 208 may also issue permissive access requests as discussed above, or the minor identifier of the second generation identifier may indicate a lower priority than the minor identifier of the stored generation identifier. In both of these examples, node 210 is able to finish processing the workload in the event that it is operating normally but is unable to communicate with node 204. Therefore, node 208 may only gain access to the target data if node 210 is no longer accessing the target data, e.g., if node 210 has finished processing, lost connectivity with storage system 216, or experienced a failure in addition to the communication failure with node 204. In the event that the second generation identifier did not indicate a higher priority than the stored generation identifier, once node 208 gains access to the target data, node 208 may receive a higher-priority third generation identifier from node 204. The higher-priority generation identifier may then be stored in persistent storage 224.

Despite the communication failure between nodes 204 and 210, node 210 may continue processing the first workload. After the first workload has been reassigned to node 208 and node 208 has been granted access to the target data by node 216A, node 210 may send a file access request to node 216A. The file access request may include or refer to the first generation identifier. Upon receiving the access request, scalable file server 218 evaluates the generation identifier associated with the file access request. Scalable file server 218 will determine that the first generation identifier associated with the file access request indicates a lower priority than the stored generation identifier. As a result, node 216A denies the file access request and indicates to node 210 that the workload has been reassigned to another node. In some examples, the indication may inform node 210 that the workload has been reassigned to node 208. Node 210 may then stop processing the first workload.

Eventually, node 204 may experience a communication failure with node 202. As a result of the failure, node 202 reassigns the first workload to node 206 by generating a fourth generation identifier comprising a second major identifier and a third minor identifier. The third minor identifier may indicate a priority similar to the first or second minor identifiers, or it may indicate a different priority altogether. The fourth generation identifier, first workload identifier, and first workload may be communicated to node 206. Node 206 may then further distribute the workload to one of its worker nodes, e.g., node 212. As a result, the fourth generation identifier, first workload identifier, and first workload to node 212 may be communicated to node 212.

Node 212 begins processing the first workload, sending an access request for target data to node 216B as necessary. A file access request may be associated with or include a generation identifier and/or a workload identifier, such as the fourth generation identifier and the first workload identifier.

Node 216B receives the file access requests. If the target data is locked (e.g., by node 210 using the same workload identifier), scalable file server 218 determines whether the fourth generation identifier denotes a higher priority than the stored generation identifier. If the major identifier of the fourth generation identifier indicates a higher priority than the major identifier of the stored generation identifier, node 216B breaks node 208's lock on the target data, locks the target data for node 212, and grants the access request. Scalable file server 218 may ignore the minor identifier upon determining that the major identifier indicates a higher priority. Additionally, the stored generation identifier in persistent storage 224 may be replaced with the higher-priority fourth generation identifier. If the major identifier of the fourth generation identifier does not indicate a higher priority, node 216B may indicate to node 212 that the target data is locked. Further, the indication may also inform node 212 that the target data is locked by node 208. In examples, node 212 may communicate such information to node 202.

Node 212 may also issue permissive access requests as discussed above, or the fourth generation identifier may indicate a lower priority than the stored generation identifier. In both of these examples, node 212 only gains access to the target data once node 208 has finished its access request and/or, in some examples, has released its lock. In the event that the fourth generation identifier did not indicate a higher priority than the stored generation identifier, once node 212 gains access to the target data, node 212 may receive a higher-priority fifth generation identifier from node 202. The higher-priority generation identifier is stored in persistent storage 224. This prevents node 208 from regaining access using its lower-priority generation identifier once node 212 gains access to the target data.

Despite the communication failure between nodes 204 and 202, node 208 may continue processing the first workload. After the first workload has been reassigned to node 212 and node 212 has been granted access to the target data by node 216B, node 208 may send a file access request to node 216A. The file access request may include or refer to a sixth generation identifier comprised of the first major identifier and a fourth minor identifier. The fourth minor identifier may indicate a priority similar to the first, second, or third minor identifiers, or it may indicate a different priority altogether. Upon receiving the access request, scalable file server 218 evaluates the generation identifier associated with the file access request. Scalable file server 218 determines that the major identifier of the sixth generation identifier associated with the file access request indicates a lower priority than the major identifier of the stored generation identifier. In examples, the priority indication of the minor identifier may be ignored because a determination of higher priority has already been made based on the priority indicated by the major identifiers of the generation identifiers. As a result, node 216A denies the file access request and indicates to node 208 that the workload has been reassigned to another node. In some examples, the indication may inform node 208 that the workload has been reassigned to node 212. Node 208 may then stop processing the first workload.

As may be appreciated, the above description of system 200 is not intended to limit the examples described herein. FIG. 2 and its description are merely intended to illustrate implementation of some examples. Thus, examples are not limited to what is shown and described in FIG. 2.

Figure 3:
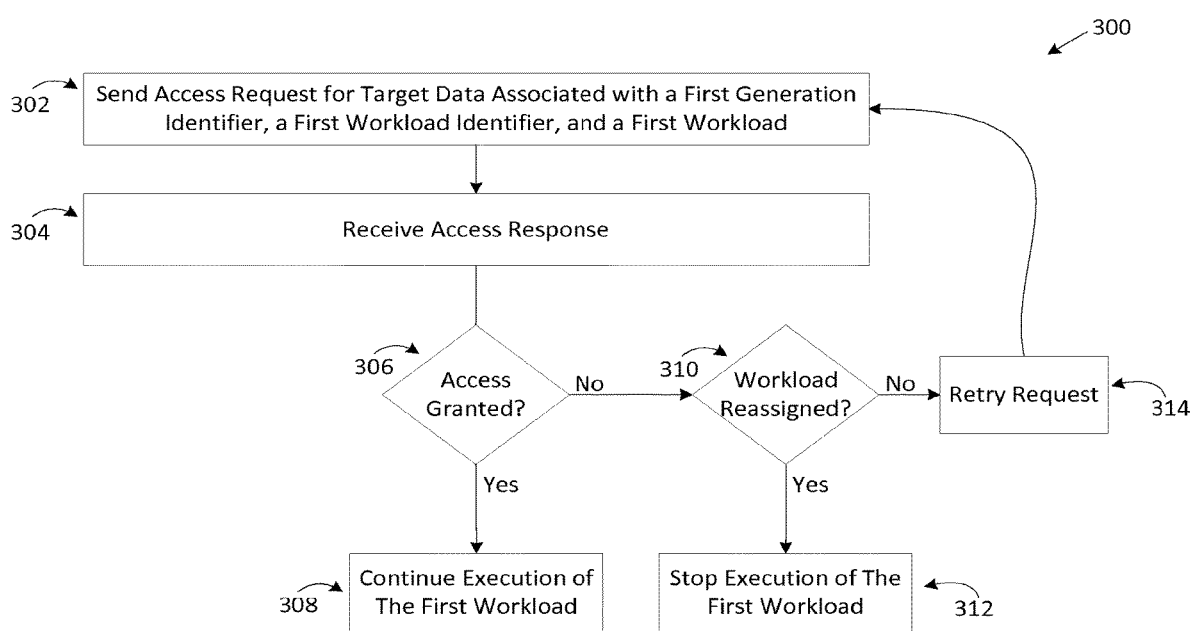
FIG. 3 is an operational flow for a node communicating with a storage system.
Figure 4:
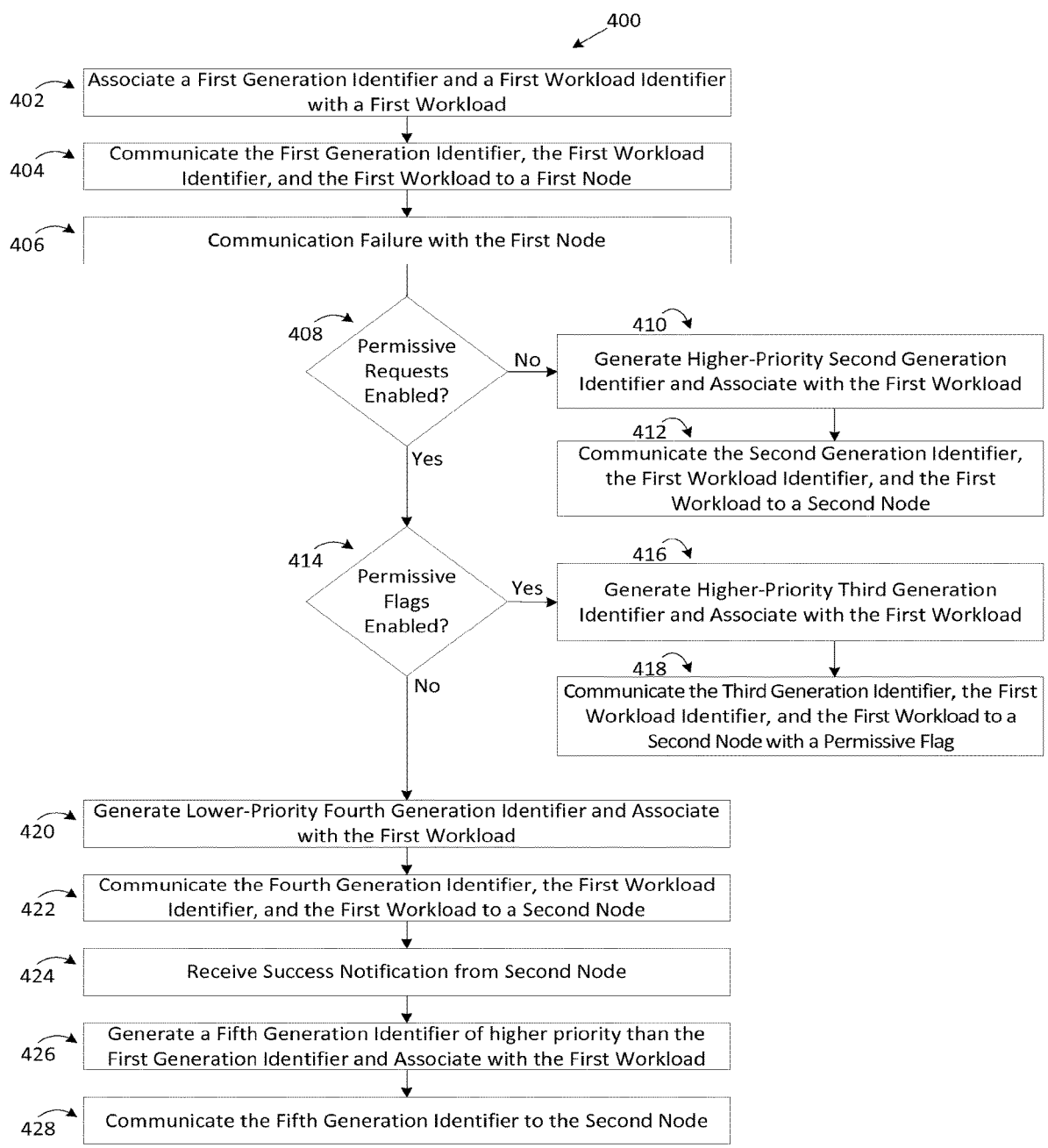
FIG. 4 is an operational flow for a node assigning workloads to other nodes.
Figure 5:
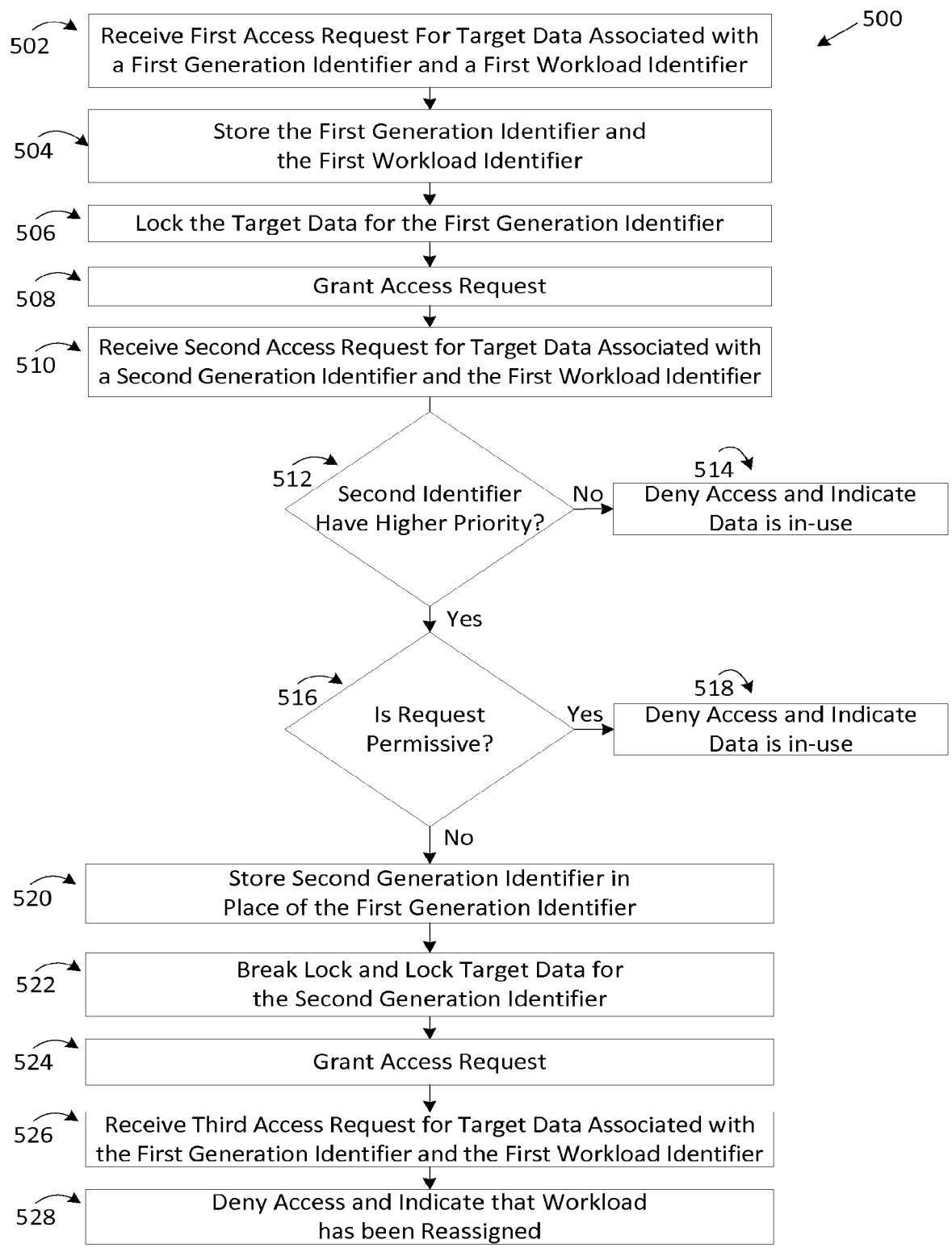
FIG. 5 is an operational flow for a storage system communicating with a node.

FIGS. 3, 4, and 5 illustrate operational flows 300, 400, and 500 according to examples. Operational flows 300, 400, and 500 may be performed in any suitable computing environment. For example, the operational flows may be executed by environments such as illustrated in FIGS. 1 and 2. Therefore, the description of operational flows 300, 400, and 500 may refer to at least one of the components of FIGS. 1 and 2. However, it is to be understood that the implementations of FIGS. 1 and 2 are non-limiting environments for operations flows 300, 400, and 500.

Furthermore, although operational flows 300, 400, and 500 are illustrated and described sequentially in a particular order, in other examples, the operations may be performed in different orders, multiple times, and/or in parallel. Further, one or more operations may be omitted or combined in some examples. In addition, it should be understood that ordinals such as "first" are not intended to imply an order or sequence, unless otherwise specified, and are used to distinguish between similar elements. For example, a "first generation identifier" need not be an initial generation identifier, but should be read to be different from a "second generation identifier."

Operational flow 300 illustrates operations, e.g., for a node that is communicating with a storage system. In examples, flow 300 illustrated in FIG. 3 may be performed by a node that is processing a workload, e.g., node 210 (FIG. 2).

Flow 300 begins at operation 302, where an access request for target data is sent. The access request may be associated with a first generation identifier, a first workload identifier, and a first workload. In one example, the first generation identifier may be sent in a message transmitted via a network. The generation identifier may be transmitted in the same message containing the request in operation 302, or it may be transmitted in a different message. In such examples, an object containing the generation identifier, such as but not limited to the _NETWORK_APP_INSTANCE_VERSION_ECP_CONTEXT, may be sent at operation 302.

In one example, an interface may be used to send the generation identifier at operation 302. The interface may be a kernel level interface located on a node or available to a node operating in a clustered environment. In examples, the kernel level interface may be used by a node to send a generation identifier to a storage system. The following is a non-limiting example of a kernel level interface that may be employed at operation 302 to send an application instance identifier:

```
//
// ECP context for an application to provide its instance ID.
//
typedef struct _NETWORK_APP_INSTANCE_VERSION_ECP_CONTEXT {
    //
    // This must be set to the size of this structure.
    //
    USHORT Size;
    //
    // This must be set to zero.
    //
    USHORT Reserved;
    //
    // The caller places the major version and minor version.
    // This ECP must accompany a NETWORK_APP_INSTANCE_ECP to be
    // valid.
```

```
//
    UINT64 VersionHigh;
    UINT64 VersionLow;
}       NETWORK_APP_INSTANCE_VERSION_ECP_CONTEXT,
*PNETWORK_APP_INSTANCE_VERSION_ECP_CONTEXT;
//
// The GUID used for the NETWORK_APP_INSTANCE_ECP_CONTEXT
structure.
    // {6AA6BC45-A7EF-4af7-9008-FA462E144D74}
    //
    DEFINE_GUID(GUID_ECP_NETWORK_APP_INSTANCE_VERSION,
0xb7d082b9, 0x563b, 0x4f07, 0xa0, 0x7b, 0x52, 0x4a, 0x81, 0x16, 0xa0, 0x10);
```

Although a specific kernel level interface is provided, one of skill in the art will appreciate that other interfaces may be employed at operation 302 to send the generation identifier.

Flow then continues to operation 304, where an access response is received. At decision 306, a determination is made whether access to the target data was granted. Access may not be granted because, for example, the target data is locked or in-use by a different workload as indicated by the workload identifier, or the workload identifier indicates the same workload but the first generation identifier indicates a lower priority than the identifier that was initially associated with another access request for the target data. In other examples, access may be denied because the first access request indicated that a pre-existing lock on the target data should not be broken if the target data is still in-use.

If, at decision 306, access to the target data was granted, flow passes to operation 308, where execution of the first workload continues. After operation 308, operational flow ends.

If, at decision 306, access to the target data was not granted, flow continues to decision 310, where a determination is made regarding whether the access response indicates that the workload was reassigned.

If, at decision 310, an indication was received that the workload was reassigned, flow moves to operation 312 where execution of the first workload is stopped as a result of the received indication. In some examples, the access response may also indicate the node to which the workload was assigned. After operation 312, operational flow ends.

If, at decision 310, an indication was not received that the workload was reassigned, flow continues to operation 314 where the access request may be retried periodically, returning to operation 302 after a period of time.

Operational flow 400 illustrates operations, e.g., for a node that is assigning workloads to other nodes. In examples, flow 400 may be performed by a node that is distributing work, e.g., node 202 (FIG. 2).

Flow 400 begins at operation 402, where a first generation identifier and a first workload identifier are associated with a first workload. At operation 404, the first generation identifier, the first workload identifier, and the first workload are communicated to a first node.

Flow then passes to operation 406, in which a failure occurs. The failure may result, e.g., from a connection interruption, a hardware failure, or a reboot, etc. At decision 408, a determination is made whether permissive requests are enabled. In examples, permissive requests allow the first node to continue processing the first workload in the event that the first node is a worker node that is operating normally but has stopped communicating with its master node, and the first workload is reassigned by the master node. As discussed, there are two methods by which permissive requests can be enabled, and the behavior of the master node assigning work to worker nodes is affected by both (a) whether permissive requests are enabled; and (b) whether a positive indication of a permissive request (e.g., a permissive flag) is enabled. If no permissive requests are enabled (e.g., the master node does not support them), then the master node will default to providing a second node with a second generation identifier that has a higher priority than the first generation identifier. If permissive requests are enabled, but permissive flags are not supported (either by the second node or by the storage system), then the master node may provide a second node with a second generation identifier with a lower priority than the first generation identifier (so that when presented to the storage system, the second generation identifier will not interrupt any active work being done by the first node on the target data). If permissive flags are enabled, however, the master node may generate and provide to the second node a higher-priority generation identifier but with a permissive flag set within it (or instructions to the second node to set such flag) such that the storage system will ignore the higher-priority generation identifier while any active work is still being done by the first node on the target data. This is further discussed below.

If, at decision 408, it is determined that permissive requests are not enabled, flow continues to operation 410 where a second generation identifier indicating a higher priority than the first generation identifier is generated and associated with the first workload. In operation 412, the second generation identifier, the first workload identifier, and the first workload are communicated to a second node. Operational flow ends at operation 412.

If, at decision 408, it is determined that permissive requests are enabled, flow passes to decision 414 where a determination is made whether permissive flags are enabled. In some examples, permissive flags may be enabled and used by a worker node to indicate to a storage system that a file access request should not be granted if the target data is in-use or locked, even if the file access request is associated with a generation identifier indicating a higher priority.

If, at decision 414, it is determined that permissive flags are enabled, flow continues to operation 416 where a third generation identifier indicating a higher priority than the first generation identifier is generated and associated with the first workload. At operation 418, the third generation identifier, the first workload identifier, and the first workload are communicated to a second node, along with a permissive flag or indication that the second node should set a permissive flag when making an access request to the storage system. After operation 418, operational flow ends.

If, at decision 414, it is determined that permissive flags are not enabled, flow continues to operation 420 where a fourth generation identifier indicating a lower priority than the first generation identifier is generated and associated with the first workload. At operation 422, the fourth generation identifier, the first workload identifier, and the first workload are communicated to a second node. Flow continues to operation 424 where a notification indicating that target data has been successfully accessed is ultimately received from the second node. Flow then continues to operation 426, where a fifth generation identifier indicating a higher priority than the first generation identifier is generated and associated with the first workload. At operation 428, the fifth generation identifier is communicated to the second node. After operation 428, operational flow 400 ends.

Operational flow 500 illustrates operations, e.g., for a storage system communicating with a node. In examples, flow 500 may be performed by a storage system, such as one or more file servers, e.g., node 216A and/or node 216B (FIG. 2).

Flow 500 begins with operation 502, where a first access request for target data is received. The first access request is associated with a first generation identifier and a first workload identifier. In some examples, the first generation identifier and/or the first workload identifier may be included as part of the first access request. The access request for target data may include a number of file operations to perform on the target data. The operations may be, for example, opens to read/write data, enumerate attributes, lease requests to allow caching of data locally, or other file access operations. After operation 502, flow 500 passes to operation 504 where the first generation identifier and the first workload identifier are stored in persistent storage.

At operation 506, the target data is locked for use and associated with the first generation identifier. The target data may also be associated with the first workload identifier. Flow passes to operation 508, where access to the target data is granted. Continuing to operation 510, a second access request for target data is received. The second access request may be associated with, or refer to, a second generation identifier and/or the first workload identifier.

At decision 512, a determination is made whether the second generation identifier has a higher priority than the stored identifier. In some examples, the determination may be based on comparing the priority indicated by various subparts of the generation identifier, e.g., a major identifier subpart and a minor identifier subpart.

If, at decision 512, it is determined that the second generation identifier does not indicate a higher priority, flow continues to operation 514 where the access request is denied and an indication is made that the target data is in-use. In examples, such indication may include an indication that the target data is in-use by a particular node. After operation 514, operational flow ends.

If, at decision 512, it is determined that the second generation identifier does have a higher priority, flow continues to decision 516 where a determination is made whether the second access request is permissive. If, at decision 516, it is determined that the second access request is permissive, flow continues to operation 518 where the access request is denied and an indication is made that the target data is in use. After operation 518, operational flow ends. In examples, a node making the second access request would retry the second access request until the target data is no longer locked.

If, at decision 516, it is determined that the second access request is not permissive, operational flow 500 progresses to operation 520 where the second generation identifier is stored in place of the first generation identifier in persistent storage. At operation 522, the lock associated with the first generation identifier on the target data is broken, and a lock is placed on the target data, which may be associated with the second generation identifier. Continuing to operation 524, the access request is granted.

At operation 526, a third access request is received. The third access request may be associated with, or refer to, the first generation identifier and the first workload identifier. Flow progresses to operation 528, where the third access request is denied because the first generation identifier does not indicate a higher priority than the stored generation identifier. Further, an indication is made that the target data has been reassigned. Operational flow 500 then concludes.

Figure 6:
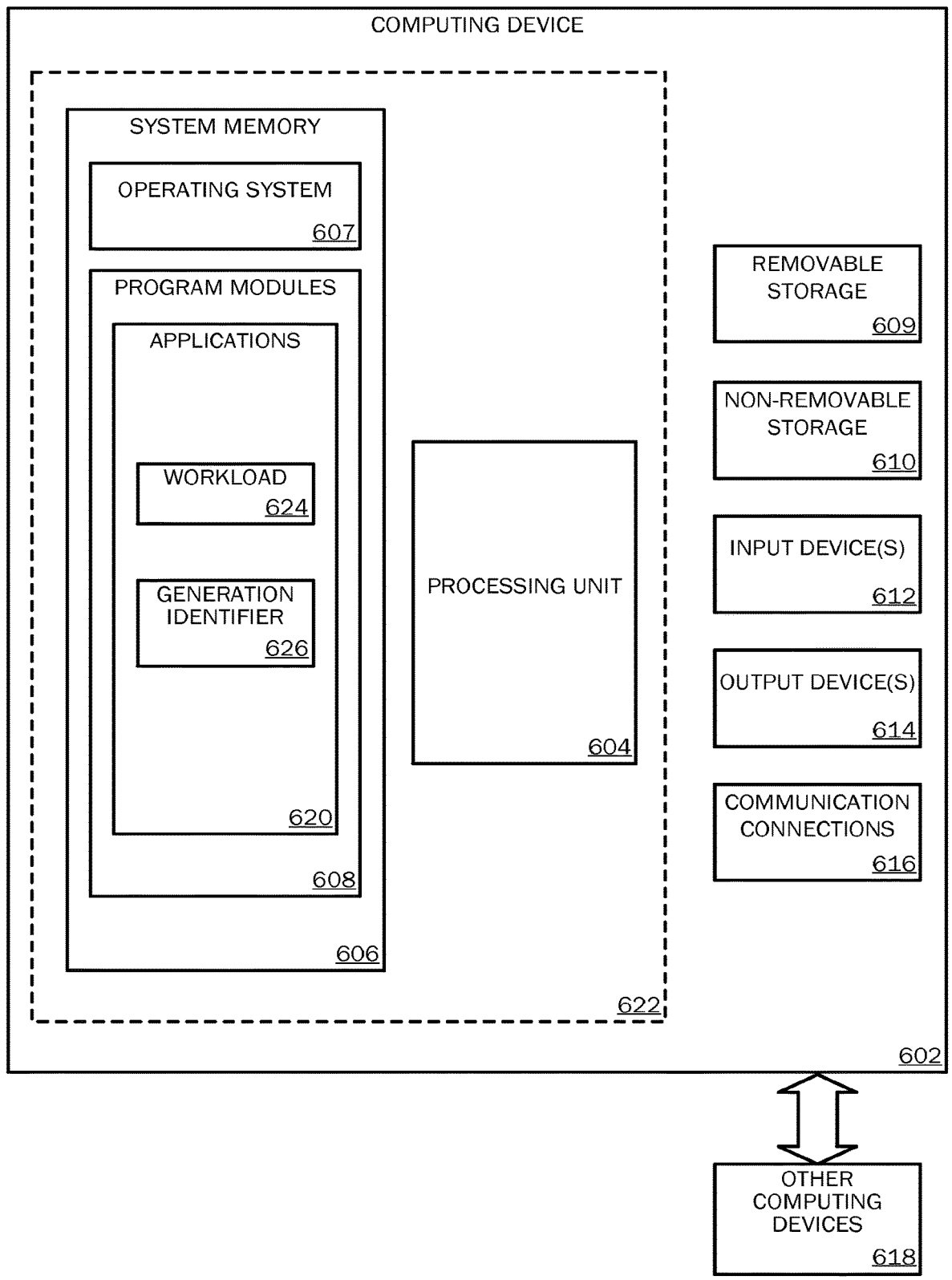
FIG. 6 is a block diagram illustrating an example of a computing device with which aspects of the invention may be practiced.
Figure 7A:
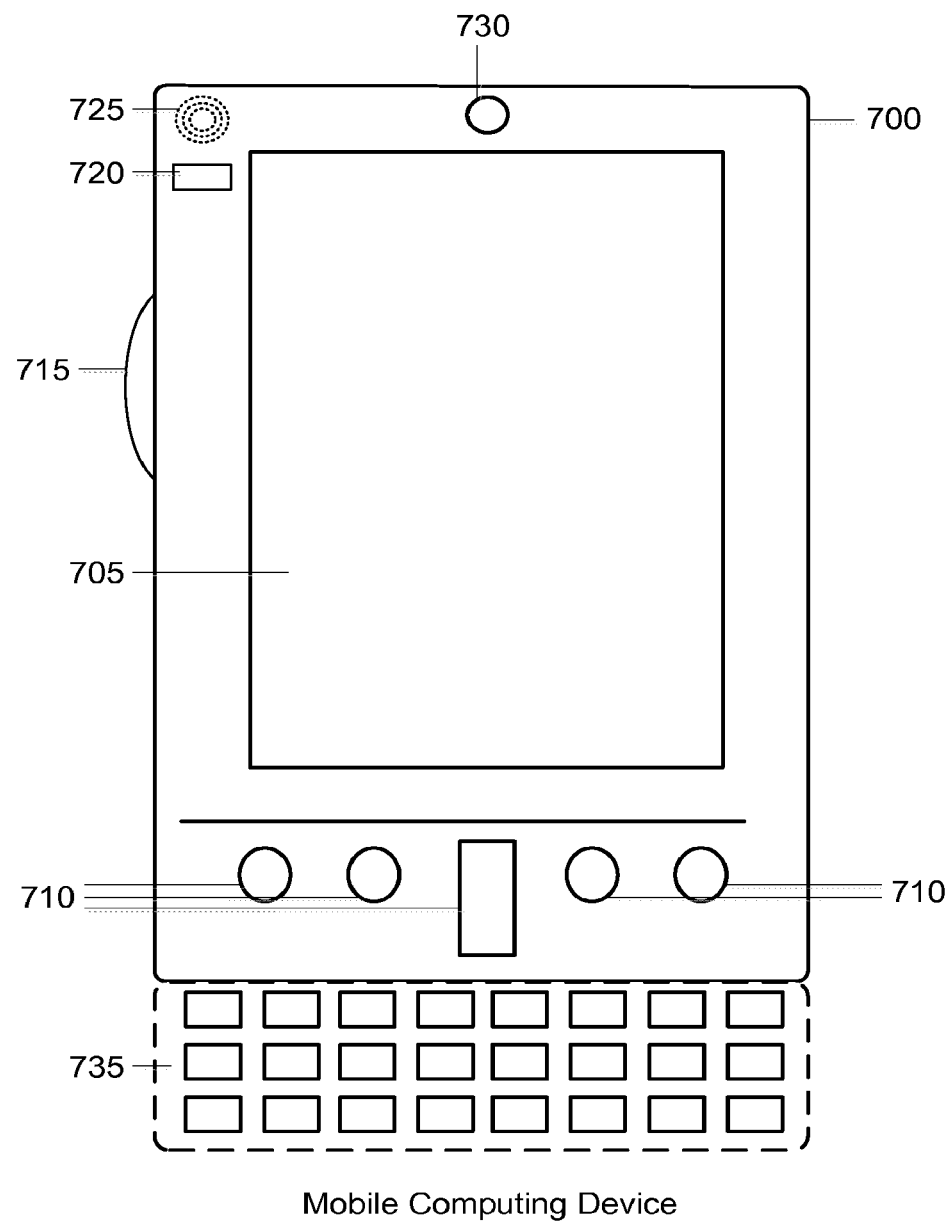
FIGS. 7A and 7B are simplified block diagrams of a mobile computing device with which aspects of the present invention may be practiced.
Figure 7B:
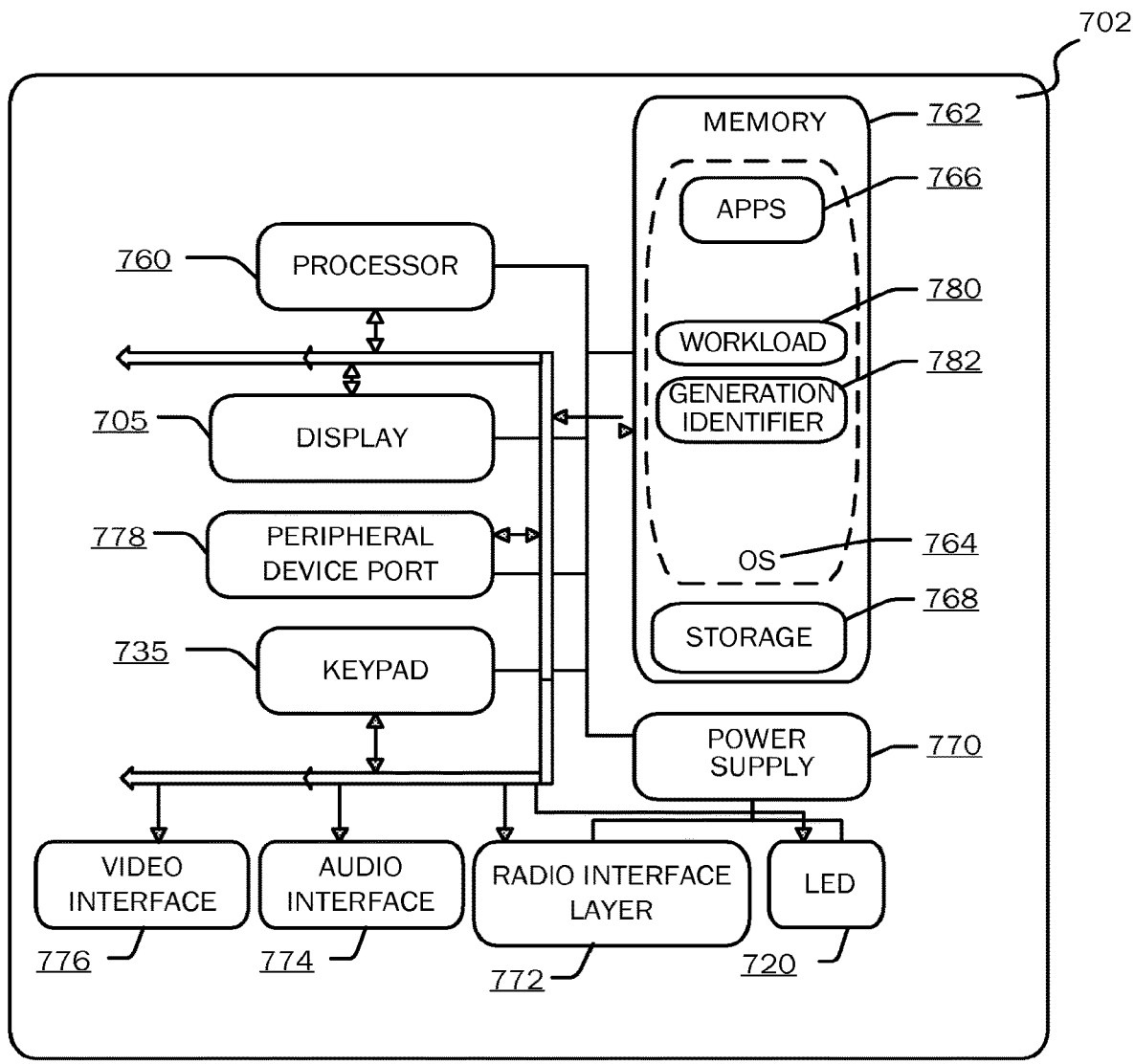
Figure 8:
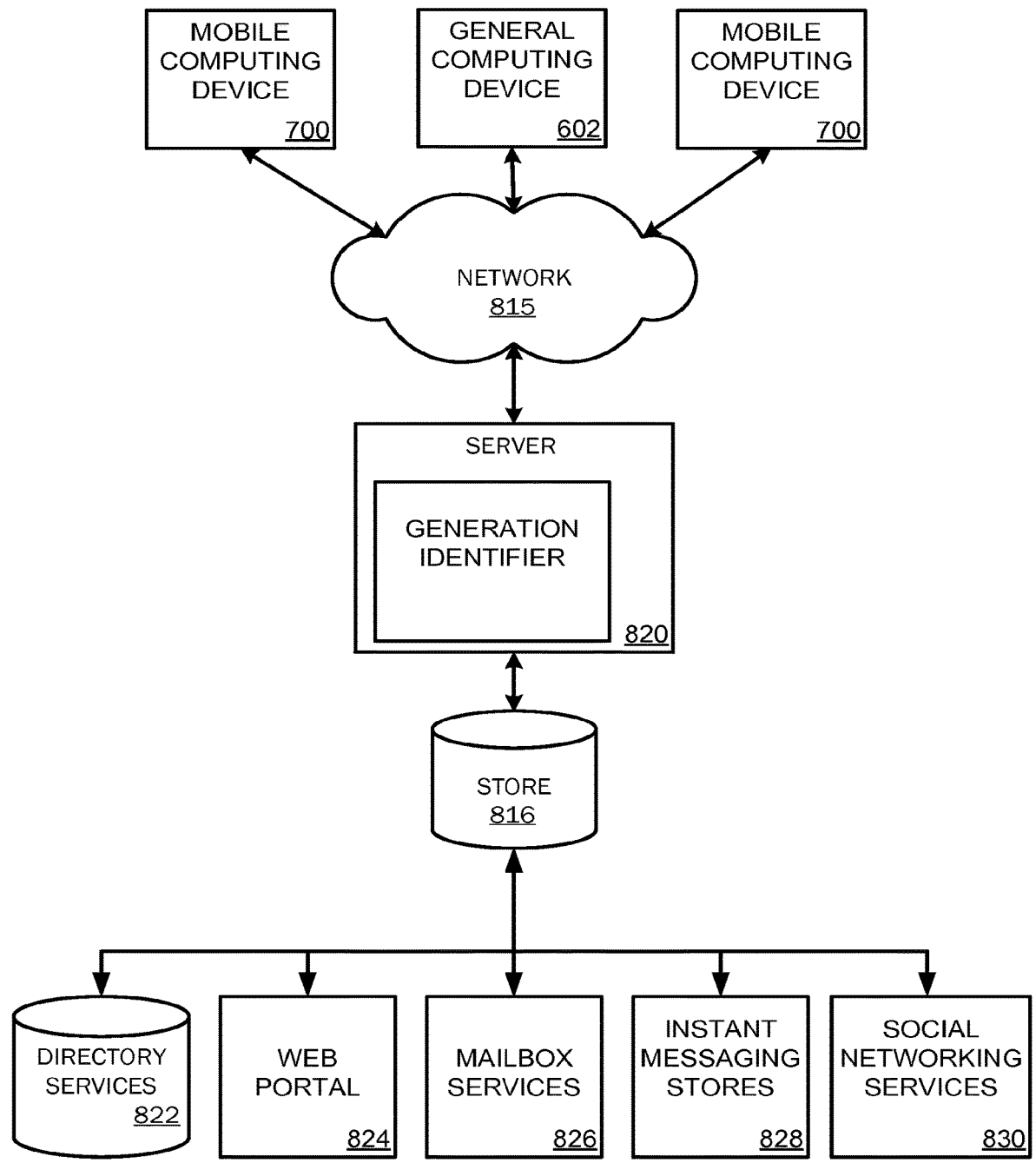
FIG. 8 is a simplified block diagram of a distributed computing system in which aspects of the present invention may be practiced.

FIGS. 6-8 and the associated descriptions provide a discussion of a variety of operating environments in which examples of the invention may be practiced. However, the devices and systems illustrated and discussed with respect to FIGS. 6-8 are for purposes of example and illustration and are not limiting of a vast number of computing device configurations that may be utilized for practicing examples of the invention, described herein.

FIG. 6 is a block diagram illustrating physical components of a computing device 602, for example nodes 202, 204, 206, 208, 210, 212, 214, 216A, and 216B, with which examples of the present disclosure may be practiced. The computing device components described below may be suitable for the computing devices described above. In a basic configuration, the computing device 602 may include at least one processing unit 604 and a system memory 606. Depending on the configuration and type of computing device, the system memory 606 may comprise, but is not limited to, volatile storage (e.g., random access memory), non-volatile storage (e.g., read-only memory), flash memory, or any combination of such memories. The system memory 606 may include an operating system 607 and one or more program modules 608 suitable for running software applications 620 such as workload 624 associated with generation identifier 626. The operating system 607, for example, may be suitable for controlling the operation of the computing device 602. Furthermore, examples of the invention may be practiced in conjunction with a graphics library, other operating systems, or any other application program and is not limited to any particular application or system. This basic configuration is illustrated in FIG. 6 by those components within a dashed line 622. The computing device 602 may have additional features or functionality. For example, the computing device 602 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 606. While executing on the processing unit 604, the program modules 608 (e.g., workload 624 associated with generation identifier 626) may perform processes including, but not limited to, one or more of the stages of the operational flows 300, 400, and 500 illustrated in FIGS. 3, 4, and 5. Other program modules that may be used in accordance with examples of the present invention may include electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 602 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 602 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 602 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 606, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 602. Any such computer storage media may be part of the computing device 602. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which examples of the invention may be practiced. For example, mobile computing device 700 may be used to implement nodes 202, 204, 206, 208, 210, 212, and 214. With reference to FIG. 7A, one example of a mobile computing device 700 for implementing the examples is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative examples, mobile computing device 700 may incorporate more or less input elements. For example, the display 705 may not be a touch screen in some examples. In yet another alternative example, the mobile computing device 700 is a portable phone system, such as a cellular phone. The mobile computing device 700 may also include an optional keypad 735. Optional keypad 735 may be a physical keypad or a "soft" keypad generated on the touch screen display. In various examples, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 can incorporate a system (i.e., an architecture) 702 to implement some examples. In one examples, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including workload 780 associated with generation identifier 782 described herein.

The system 702 has a power supply 770, which may be implemented as one or more batteries. The power supply 770 might further include an external power source, such as an AC adapter or a powered docking cradle that supplements or recharges the batteries.

The system 702 may include peripheral device port 778 that performs the function of facilitating connectivity between system 702 and one or more peripheral devices. Transmissions to and from the peripheral device port 772 are conducted under control of the operating system 764. In other words, communications received by the peripheral device port 778 may be disseminated to the application programs 766 via the operating system 764, and vice versa.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with examples of the present invention, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one example of the architecture of a system for providing a cluster that processes distributed workloads and handles failures to one or more client devices, as described above. Target data accessed, interacted with, or edited in association with nodes 202, 204, 206, 208, 210, 212, or 214 may be stored in different communication channels or other storage types. For example, various documents may be stored using a directory service 822, a web portal 824, a mailbox service 826, an instant messaging store 828, or a social networking site 830. A node processing a workload, e.g., node 210, may use any of these types of systems or the like for enabling data utilization, as described herein. A server 820 may provide storage system 216 for use by nodes 208, 210, 212, and 214 operating on general computing device 602 and mobile device(s) 700 through network 815. By way of example, network 815 may comprise the Internet or any other type of local or wide area network, and nodes 202, 204, 206, 208, 210, 212, and 214 may be implemented as a computing device 602 embodied in a personal computer, a tablet computing device, and/or by a mobile computing device 700 (e.g., a smart phone). Any of these embodiments of the client computing device 602 or 700 may obtain content from the store 816.

The present disclosure includes a system including at least one processor; memory, operatively connected to the at least one processor and containing instructions that, when executed by the at least one processor, perform a method, the method comprising: associating a first generation identifier and a first workload identifier with a first workload; communicating the first generation identifier, the first workload identifier, and the first workload to a first node; and during a communication failure with the first node, generating a second generation identifier, associating the second generation identifier with the first workload, and communicating the second generation identifier, the first workload identifier, and the first workload to a second node, wherein the second generation identifier communicates a different priority from the first generation identifier. In examples, the communication failure comprises at least one of: a disconnection, a hardware failure, or a reboot of a node. In addition, the second generation identifier may communicate a higher priority than the first generation identifier. In other examples, the second generation identifier may communicate a lower priority than the first generation identifier. In additional examples, the systems and methods comprise receiving an indication of success from the second node; generating a third generation identifier communicating a higher priority than the first generation identifier; associating the third generation identifier with the first workload; and communicating the third generation identifier to the second node. Further, communicating the second generation identifier may comprise sending an indication that the second node should not interrupt the first node if it is determined that the first node is still processing the first workload. In addition, in examples, the first and second generation identifiers are each comprised of at least two subparts, each of the at least two subparts communicating a priority. Further, in examples, the priority communicated by each of the at least two subparts is weighted such that an indication of priority by one of the at least two subparts preempts priority indicated by another subpart of the at least two subparts.

Among other examples, the present disclosure presents systems and methods for receiving a first access request for target data, the target data stored by a storage system, and the first access request associated with a first generation identifier and a first workload identifier; storing the first generation identifier and the first workload identifier in persistent storage as a first stored generation identifier and a first stored workload identifier; granting the first access request for the target data; receiving a second access request for the target data, the second access request associated with a second generation identifier and the first workload identifier; comparing the second generation identifier to the first stored generation identifier and the first workload identifier to the first stored workload identifier; determining that the second generation identifier indicates a higher priority than the first stored generation identifier, and that the first workload identifier matches the first stored workload identifier; storing the second generation identifier in persistent storage as a second stored generation identifier; granting the second access request for the target data; receiving a third access request for the target data, the third access request associated with the first generation identifier and the first workload identifier; determining that the first generation identifier indicates a lower priority than the second stored generation identifier and that the first workload identifier matches the first stored workload identifier; and denying the third access request for the target data. In examples, the first access request and the third access request are received from a first node and the second access request is received from a second node, and denying the third access request for the target data comprises providing an indication to the first node that the first workload has been reassigned to the second node. In further examples, denying the third access request comprises providing an indication that the first generation identifier indicates a lower priority than the second stored generation identifier. In additional examples, the systems and methods comprise receiving a fourth access request for the target data from a second node, the fourth access request associated with a third generation identifier and the first workload identifier, and comprising an indication that the request is permissive; determining that the third generation identifier indicates a higher priority than the second stored generation identifier; determining that the storage system can still communicate with the first node; and denying the fourth access request for the target data. Further, in examples, denying the fourth access request comprises providing an indication to the second node that the storage system can still communicate with the first node. In other examples, the systems and methods comprise locking the target data upon granting the first access request; and after granting the second access request, releasing the lock on the target data and removing the first stored generation identifier from persistent storage. In addition, in examples, the first, second, and third generation identifiers are each comprised of at least two subparts, each of the at least two subparts communicating a priority. Further, the priority communicated by each of the at least two subparts may be weighted such that an indication of priority by one of the at least two subparts preempts priority indicated by another subpart of the at least two subparts.

Further descriptions herein disclose systems and methods for sending a first access request for target data to the storage system, the first access request associated with a first generation identifier and a first workload identifier associated with a first workload executing on a first node; receiving a first access response granting access to the target data; after receiving the first access response, sending an indication to a second node that access to the target data was granted; receiving a second generation identifier for use in subsequent access requests; sending a second access request for target data to the storage system, the second access request associated with the second generation identifier and the first workload identifier; and receiving a second access response granting access to the target data. In additional examples, the systems and methods comprise sending a third access request for target data to the storage system, the third access request associated with the second generation identifier and the first workload identifier; receiving a third access response denying access to the target data and comprising an indication that access to the target data for the first workload has been reassigned to a third node; and stopping execution of the first workload on the first node as a result of the received third access response. Further, in examples, the first access request comprises an indication that the first access request is permissive. In other examples, the third access response is received after a communication failure between the first node and the second node.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

We claim:

1. A system comprising:
   at least one processor;
   memory operatively connected to the at least one processor and including instructions that are executable by the at least one processor to cause the system to:
   generate, by a master node, a first generation identifier associated with a workload;
   communicate, by the master node, the first generation identifier to a first worker node, wherein communicating the first generation identifier to the first worked node operates as an assignment of the workload to the first worker node; and
   in response to determining that the master node and at least the first worker node are not in communication:
   determine whether permissive flags are enabled; and
   in response to a determination that the permissive flags are enabled, communicate, by the master node to a second worker node, a permissive flag and a second generation identifier associated with the workload, wherein:
   communicating the permissive flag and the second generation identifier to the second node operates as a reassignment of the workload to the second worker node, the second generation identifier is associated with a priority that is higher than a priority associated with the first generation identifier, and the permissive flag indicates that the workload should not be reassigned to the second worker node if the first worker node is processing the workload.

2. The system of claim 1, wherein the workload is associated with a workload identifier, wherein communication of the first generation identifier to the first worker node further comprises communication of the workload identifier to the first worker node, and wherein communication of the second generation identifier to the second worker node further comprises communication of the workload identifier to the second worker node.

3. The system of claim 1, wherein, in response to a determination that the permissive flags are not enabled, communicate, by the master node to the second worker node, a third generation identifier associated with the workload, wherein communicating the third generation identifier to the second worker node operates as a different reassignment of the workload to the second worker node, and wherein the third generation identifier is associated with a priority that is lower than the priority associated with the first generation identifier.

4. The system of claim 3, wherein the system is further caused to:
receive a notification of success from the second worker node;
in response to reception of the notification, generate a fourth generation identifier associated with the workload, wherein the fourth generation identifier is associated with a priority that is higher than the priority associated with the first generation identifier; and
communicate the fourth generation identifier to the second worker node.

5. The system of claim 4, wherein the workload is associated with a workload identifier, wherein communication of the first generation identifier to the first worker node further comprises communication of the workload identifier to the first worker node, wherein communication of the third generation identifier to the second worker node further comprises communication of the workload identifier to the second worker node, and wherein communication of the fourth generation identifier to the second worker node further comprises communication of the workload identifier to the second worker node.

6. The system of claim 1, wherein the first generation identifier and the second generation identifier are each comprised of at least two subparts, each of the at least two subparts communicating a corresponding particular priority.

7. The system of claim 6, wherein the corresponding particular priority communicated by each of the at least two subparts is weighted such that an indication of priority by one of the at least two subparts preempts priority indicated by another subpart of the at least two subparts.

8. A computer-implemented method, the method comprising:
receiving a first access request for target data stored by a storage system, wherein the first access request is associated with a first generation identifier;
locking the target data in association with the first generation identifier;
receiving a second access request for the target data, wherein the second access request is associated with a second generation identifier;

determining whether the second generation identifier is associated with a higher priority than the first generation identifier;
in response to a determination that the second generation identifier is not associated with a higher priority than the first generation identifier, denying the second access request for the target data; and
in response to a determination that the second generation identifier is associated with a higher priority than the first generation identifier:
determining whether the second access request is associated with a permissive flag;
in response to a determination that the second access request is associated with the permissive flag, denying the second access request for the target data; and
in response to a determination that the second access request is not associated with the permissive flag, locking the target data in association with the second generation identifier.

9. The computer-implemented method of claim 8, further comprising:
receiving a third access request for the target data, wherein the third access request is associated with the first generation identifier; and
in response to reception of the third access request for the target data, denying the third access request for the target data.

10. The computer-implemented method of claim 9, wherein the first access request and the third access request are received from a first node and the second access request is received from a second node, and wherein denying the third access request for the target data comprises providing an indication to the first node that a workload associated with the target data has been reassigned to the second node.

11. The computer-implemented method of claim 9, wherein denying the third access request comprises providing an indication that the first generation identifier is associated with a lower priority than the second generation identifier.

12. The computer-implemented method of claim 8, wherein the first access request is received from a first node,
wherein determining whether the second access request is associated with the permissive flag comprises determining whether the storage system can communicate with the first node, and
wherein the second access request for the target data is denied in response to a determination that the second access request is associated with the permissive flag and that the storage system can communicate with the first node.

13. The computer-implemented method of claim 12, wherein the second access request is received from a second node, and wherein denying the second access request comprises providing an indication to the second node that the storage system can communicate with the first node.

14. The computer-implemented method of claim 8, further comprising:
storing the first generation identifier in persistent storage of the storage system as a first stored generation identifier; and
after granting the second access request:
storing the second generation identifier in persistent storage of the storage system as a second stored generation identifier; and
removing the first stored generation identifier from persistent storage.

15. A computer-implemented method for controlling execution of a workload, the method comprising:
- generating a first generation identifier associated with the workload;
- communicating the first generation identifier to a first worker node to assign the workload to the first worker node;
- determining that the master node and at least the first worker node are not in communication; and
- in response to determining that the master node and at least the first worker node are not in communication:
  - determining whether permissive flags are enabled; and
  - in response to a determination that the permissive flags are enabled, communicating a permissive flag and a second generation identifier associated with the workload to reassign the workload to the second worker node, wherein the second generation identifier is associated with a higher priority than the first generation identifier and the permissive flag indicates that the workload should not be reassigned to the second worker node if the first worker node is processing the workload.

16. The method of claim 15, wherein the workload is associated with a workload identifier, wherein communicating the first generation identifier to the first worker node further comprises communicating the workload identifier to the first worker node, and wherein communicating the second generation identifier to the second worker node further comprises communicating the workload identifier to the second worker node.

17. The method of claim 15, wherein, in response to a determination that the permissive flags are not enabled, communicating a third generation identifier associated with the workload to reassign the workload to the second worker node, wherein the third generation identifier is associated with a lower priority than the first generation identifier.

18. The method of claim 17, further comprising:
- receive a notification of success from the second worker node;
- in response to reception of the notification, generating a fourth generation identifier associated with the workload, wherein the fourth generation identifier is associated with a higher priority than the first generation identifier; and
- communicating the fourth generation identifier to the second worker node.

19. The method of claim 18, wherein the workload is associated with a workload identifier, wherein communicating the first generation identifier to the first worker node further comprises communicating the workload identifier to the first worker node, wherein communicating the third generation identifier to the second worker node further comprises communicating the workload identifier to the second worker node, and wherein communicating the fourth generation identifier to the second worker node further comprises communicating the workload identifier to the second worker node.

20. The system of claim 15, wherein the first generation identifier and the second generation identifier are each comprised of at least two subparts, each of the at least two subparts communicating a priority, and wherein the priority communicated by each of the at least two subparts is weighted such that an indication of priority by one of the at least two subparts preempts priority indicated by another subpart of the at least two subparts.

* * * * *